(12) United States Patent
Fraese et al.

(10) Patent No.: US 10,369,638 B2
(45) Date of Patent: Aug. 6, 2019

(54) MILLING CUTTER

(71) Applicant: Kennametal Inc., Latrobe, PA (US)

(72) Inventors: Alex Fraese, Hagenbuechach (DE); Michael Kreuzer, Nürnberg (DE); Werner Penkert, Schwanstetten (DE)

(73) Assignee: KENNAMETAL INC., Latrobe, PA (US)

( * ) Notice: Subject to any disclaimer, the term of this patent is extended or adjusted under 35 U.S.C. 154(b) by 116 days.

(21) Appl. No.: 15/349,078

(22) Filed: Nov. 11, 2016

(65) Prior Publication Data

US 2017/0136558 A1    May 18, 2017

(30) Foreign Application Priority Data

Nov. 12, 2015    (DE) .................. 10 2015 119 577

(51) Int. Cl.
*B23C 5/28* (2006.01)
*B23C 5/22* (2006.01)
*B23C 5/08* (2006.01)

(52) U.S. Cl.
CPC .............. *B23C 5/2265* (2013.01); *B23C 5/08* (2013.01); *B23C 5/2273* (2013.01); *B23C 5/28* (2013.01); *B23C 2200/045* (2013.01); *B23C 2200/164* (2013.01); *B23C 2210/168* (2013.01); *B23C 2226/18* (2013.01); *B23C 2250/12* (2013.01)

(58) Field of Classification Search
CPC ... B23C 5/2265; B23C 5/2269; B23C 5/2278; B23C 5/2437; B23C 5/2441
See application file for complete search history.

(56) References Cited

U.S. PATENT DOCUMENTS

| | | | | |
|---|---|---|---|---|
| 830,778 A | * | 9/1906 | Geer ..................... | B23C 5/2265 144/230 |
| 830,779 A | * | 9/1906 | Geer ..................... | B23C 5/2265 407/49 |
| 1,472,960 A | * | 11/1923 | Conklin ................ | B23C 5/2265 144/235 |
| 3,273,222 A | * | 9/1966 | Begle .................... | B23C 5/2278 407/38 |
| 3,309,758 A | * | 3/1967 | Williams .............. | B23C 5/2208 407/104 |

(Continued)

FOREIGN PATENT DOCUMENTS

| | | |
|---|---|---|
| EP | 0122334 B1 | 10/1990 |
| EP | 1543907 A1 | 6/2005 |
| GB | 475624 A | 11/1937 |

OTHER PUBLICATIONS

Modern Metal Cutting.
Indexable Inserts for CUtting Tools—Designation.

*Primary Examiner* — Willmon Fridie, Jr.
(74) *Attorney, Agent, or Firm* — Matthew S. Bedsole

(57) ABSTRACT

A milling cutter (10), in particular a side milling cutter, is described, having a tool body (12), to which at least one cutting insert (14) is removably secured, said cutting insert being clamped by means of a movable clamping element (16) in the tool body (12) and comprising a cutting edge (18) pointing in the direction of rotation (R). The clamping element (16) clamps the cutting insert (14) from behind and is arranged on the rear side of the cutting insert (14) in the direction of rotation (R) of the milling cutter (10).

21 Claims, 3 Drawing Sheets

(56) References Cited

U.S. PATENT DOCUMENTS

| | | | | |
|---|---|---|---|---|
| 3,391,438 A | * | 7/1968 | Milewski | B23C 5/2278 |
| | | | | 407/38 |
| 3,578,742 A | * | 5/1971 | Manthei | B23C 5/20 |
| | | | | 407/101 |
| 3,584,361 A | * | 6/1971 | Erkfritz | B23C 5/2278 |
| | | | | 29/448 |
| 3,624,879 A | * | 12/1971 | Ayer | B23C 5/2269 |
| | | | | 407/101 |
| 3,729,808 A | | 5/1973 | Wolf | |
| 3,742,565 A | * | 7/1973 | Boboltz | B23C 5/04 |
| | | | | 407/113 |
| 3,831,237 A | * | 8/1974 | Gunsalus | B23C 5/207 |
| | | | | 407/104 |
| 4,706,534 A | * | 11/1987 | Smolders | B23C 5/207 |
| | | | | 83/844 |
| 5,186,583 A | * | 2/1993 | Nakayama | B23C 5/006 |
| | | | | 407/120 |

* cited by examiner

MILLING CUTTER

RELATED APPLICATIONS

This application claims priority to German Patent Application No. 1020151195771 filed Nov. 12, 2015, the contents of which are incorporated herein by reference in its entirety.

FIELD OF THE INVENTION

The invention relates to a cutter, in particular a side milling cutter.

BACKGROUND

Milling cutters, in particular side milling cutters, are used for the chip-removing machining of workpieces, wherein the milling cutter rotates so that a relative movement between the workpiece and the milling cutter ensues. The milling cutter rotates about an axis of rotation, wherein cutting inserts arranged on the milling cutter remove material from the workpiece during the rotation. The milling cutter and/or the workpiece can furthermore experience a feed motion that is variably adjustable as needed, mostly orthogonally to the axis of rotation. Accordingly, the respective cutting inserts are not continuously engaged with the workpiece during machining of the workpiece but only when the cutting inserts are in a region of the workpiece that has not been machined yet.

The cutting inserts that are used in the milling cutters are generally arranged or clamped on a tool body of the milling cutter via clamping elements. The tool body comprises appropriate receiving areas for the cutting inserts and the clamping elements so that a defined mounting of the cutting inserts is ensured.

Generally, the cutting inserts are clamped by their associated clamping element against a stop surface on the tool body. The alignment as well as the orientation of the cutting insert is in this case also carried out via the clamping element, which generally clamps the cutting insert in the region of one of its cutting edges.

When setting a desired cutting angle, the positioning and the orientation of the cutting inserts requires the utmost attention by the operator of the milling cutter.

SUMMARY OF THE INVENTION

The task of the invention is to provide an easily equipped milling cutter, with which it is easily possible to obtain the desired orientation of the cutting inserts.

According to the invention, the task is solved by a milling cutter, in particular a side milling cutter, having a tool body, to which at least one cutting insert is removably secured, said cutting insert being clamped by means of a movable clamping element in the tool body and comprising a cutting edge pointing in the direction of rotation, wherein the clamping element clamps the cutting insert from behind and is arranged on the rear side of the cutting insert in the direction of rotation of the milling cutter.

The basic idea of the invention is to clamp the cutting insert in the milling cutter such that it abuts with its side comprising the cutting edge directly against the tool body. This ensures that the cutting insert is arranged in the desired position and orientation on the tool body. Due to the milling cutter according to the present invention, it is thus possible to precisely align the cutting insert at the beginning or during fitting with the at least one cutting insert, wherein this takes place independently of how the clamping element acts on the surface of the clamping element that comprises the cutting edge, since the clamping element is arranged on the rear side of the cutting insert. The tolerances occurring during clamping due to the additional clamping element do not impact the orientation of the cutting edge. Accordingly, the setting of the desired cutting angle can be ensured with higher precision.

BRIEF DESCRIPTION OF THE DRAWINGS

Further advantages and properties of the invention will be apparent from the following description and the drawings being referenced. In the drawings.

DETAILED DESCRIPTION

Figure 1:
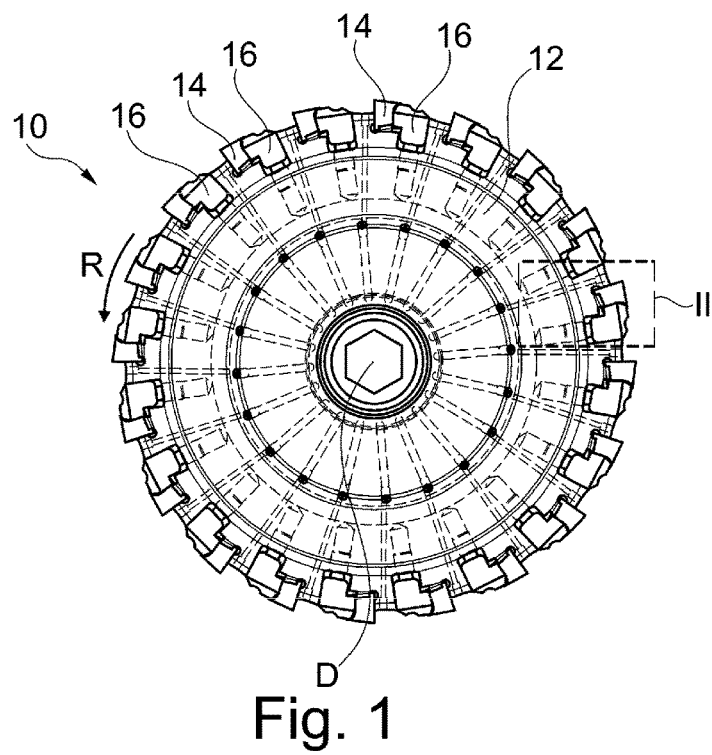
FIG. 1 shows an overview of a milling cutter according to the present invention.

One aspect of the invention provides that the tool body comprises a front stop surface and the cutting insert comprises a front contact surface, via which the tool body and the cutting insert abut against each other in the direction of rotation, and that the cutting insert has a rear contact surface on a side opposite the front contact surface, via which rear contact surface force is applied to the cutting insert by a front clamping surface of the clamping element. The clamping element thus clamps the cutting insert between its front clamping surface and the front stop surface of the tool body. In the process, the side of the cutting insert that comprises the cutting edge abuts against the front stop surface and thus directly against the tool body. The precise alignment of the cutting insert or the cutting edge can thus be provided, among other things, via the geometry of the front stop surface, which can be machined with high precision.

In particular, the rear contact surface has two partial surfaces, which are tapered toward one another against the direction of rotation and between which a wedge is formed. The wedge is preferably symmetrical, i.e. its tip is arranged centrally on the rear contact surface. In addition, the tip of the wedge can extend over the entire height of the cutting insert. The partial surfaces of the rear contact surface, which are tapered toward one another, ensure that the cutting insert is correctly aligned when viewed in the axial direction, when it is clamped by the clamping element. The wedge ensures an optimal orientation of the cutting insert with respect to the direction of rotation if the tip of the wedge is substantially orthogonal to the tangent of the direction of rotation at the point where the tip of the wedge is located.

The clamping element can have a receiving contour for the wedge, said receiving contour being formed at least in sections by the front clamping surface. This ensures that the cutting insert is clamped by the clamping element in the manner desired. The section of the receiving contour provided at the front clamping surface is preferably formed by two partial surfaces that are tapered away from one another in the direction of rotation, i.e. a geometry that is complementary to the geometry of the rear contact surface. The cutting insert takes a specified orientation and position during clamping, which is ensured by means of the complementary geometries of the receiving contour and the rear contact surface, among other things, since the receiving contour aligns the wedge and thus the cutting insert.

According to another aspect, at least one rear stop surface is provided on the tool body, on which rear stop surface the clamping element is supported with a rear clamping surface. The rear stop surface and the rear clamping surface are substantially flat so that a large-area support of the clamping element can take place. During operation of the milling cutter, the force acting on the cutting edge of the cutting insert is transferred via the cutting insert to the clamping element, which is supported extensively via its rear clamping surface on the rear stop surface of the tool body. Accordingly, the occurring forces can be transferred via a large area onto the tool body, which results in a long useful life of the components.

In particular, the front and rear stop surface together form a receiving area for the cutting insert and the clamping element, said receiving area tapering toward the axis of rotation. Accordingly, the front stop surface and the rear stop surface are designed such that they are tapered toward each other toward the axis of rotation. On the tool body is thereby formed a wedge-shaped receiving pocket, which receives the clamping element as well as the cutting insert. The wedge-shaped receiving area ensures that during the securing to the tool body, the clamping element and the cutting insert are moved toward the axis of rotation of the milling cutting or radially inward and are clamped in the tool body in the process.

According to one embodiment, the front stop surface and the front clamping surface delimit a space for the cutting insert, said space tapering toward the axis of rotation. This ensures during clamping of the cutting insert that a force acting in the circumferential direction is exerted on the cutting insert during clamping. During clamping, the cutting insert is pulled radially inward by the clamping element, until the cutting insert arrives at the desired position.

A further embodiment provides that at least one of the pairs of adjoining surfaces has geometries that are complementary to one another. The complementarily designed geometries, such as provided between the rear contact surface and the front clamping surface, ensures that the respective elements working together via the pairs of adjoining surfaces are arranged in a desired, predefined orientation toward one another. This also applies to additional pairs, such as the front stop surface and the front contact surface and/or the rear clamping surface and the rear stop surface.

Another aspect of the invention provides that the clamping element pushes the cutting insert radially inward against a seat surface of the tool body. The tool body accordingly comprises a seat surface for the cutting insert, onto which seat surface the cutting insert sits with a radially inward orientation and on which it is supported radially inward. The clamping element thus pushes the cutting insert onto the seat surface.

In particular, when viewed in the axial direction, the seat surface and the front stop surface enclose an angle of less than 90°. This ensures that during clamping, a force component that acts in the direction of rotation is exerted on the cutting insert in addition to the radially inward directed force component so that the cutting insert is pulled into the direction of the intersection point between the seat surface and the front stop surface during clamping. Accordingly, the cutting insert slides along the seat surface toward the front stop surface. The position of the cutting insert and the position of the cutting edge can thus be predetermined based on the geometries of the respective surfaces. In addition, the cutting insert is supported during operation at least partially on the seat surface so that the seat surface formed on the tool body absorbs a portion of the forces occurring during operation of the milling cutter.

Another aspect provides that a notch is provided in the tool body after the seat surface when viewed against the direction of rotation, said notch being designed as guide for the clamping element. The clamping element is thus also arranged on the tool body in a predefined position and guided into this position. The predefined position is predetermined by the geometry of the notch in the tool body. This also ensures that the cutting insert can interact via its entire rear contact surface with the clamping element in order to transfer the forces occurring during operation as evenly as possible via a large area onto the clamping element.

An embodiment provides that the cutting insert tapers toward its center axis when viewed in the axial direction. The shape of the cutting insert is adapted to the front stop surface of the tool body and the front clamping surface of the clamping element, which ensures that the cutting insert is effectively clamped in a predefined manner. In the process, the seat surface on the tool body is in particular taken into consideration, which seat surface encloses an angle of less than 90° with the front stop surface. Therefrom derived is, among other things, the tapered shape of the cutting insert when viewed in the axial direction.

Another aspect of the invention provides that a set screw is provided, via which the clamping element is adjustably secured to the tool body, in particular that the set screw is substantially adjustable radially and/or in particular that the set screw has opposite threads at its axial end regions and is screwed into the tool body with one thread and into the clamping element with the other thread. Via the set screw, the clamping element can be easily clamped onto the tool body so that the clamping element during securing and due to its shape exerts a clamping force onto the cutting insert. The radial adjustability of the set screw ensures that the clamping element is always oriented orthogonally to the tangent of the axis of rotation, whereby the forces occurring during operation cannot loosen the securing of the clamping element, among other things. The opposite thread ensures that a quicker and better adjustable securing of the clamping element is possible during the screwing in of the set screw. Due to the opposite threads at the axial end regions, the relative movement of the clamping element with respect to the tool body doubles per turn of the set screw when screwing in the set screw.

According to a further embodiment, the tool body comprises at least one cooling channel that opens in the direction of rotation in front of the cutting insert. This ensures in a simple manner that the cutting insert can be cooled during operation since the cooling channel associated with the cutting insert is arranged in the direction of rotation in front of the cutting insert so that the liquid exiting the cooling channel or the exiting cooling liquid strikes the associated cutting insert as a result of the rotational movement. A complex guidance of the coolant to the cutting insert is not necessary, in particular to its cutting edge, since this is already ensured by the rotation of the milling cutter.

A further embodiment provides that the cutting insert is an indexable insert and/or a ceramic insert and/or that several of the same cutting inserts and corresponding clamping elements are distributed and arranged on the perimeter of the milling cutter. An efficient milling cutter is thereby designed since the cutting inserts can be used several times by simply turning them. In addition, a ceramic insert has proven to be a cost-effective alternative to the previous solid carbide cutting inserts. As a result of the several cutting inserts arranged on the tool body, the machining time is reduced since work can be performed at a higher feed speed, among other things.

FIG. 1 shows a milling cutter 10 that is designed as a side milling cutter. The milling cutter 10 comprises a rotating tool body 12, to which several cutting inserts 14 are respectively removably secured to the tool body 12 in the embodiment shown via a clamping element 16 associated with them.

The milling cutter 10 is rotatably driven by a drive unit not shown here so that the cutting inserts 14 arranged on the rotating tool body 12 rotate along a direction of rotation R. The tool body 12 with the cutting inserts 14 arranged thereon and clamping elements 16 rotates accordingly about the axis of rotation D, which protrudes from the drawing plane in the FIG. 1 shown.

The feed direction of the milling cutter 10 is thus in the illustration shown in the drawing plane or parallel to it, as is the direction of rotation R.

Figure 2:
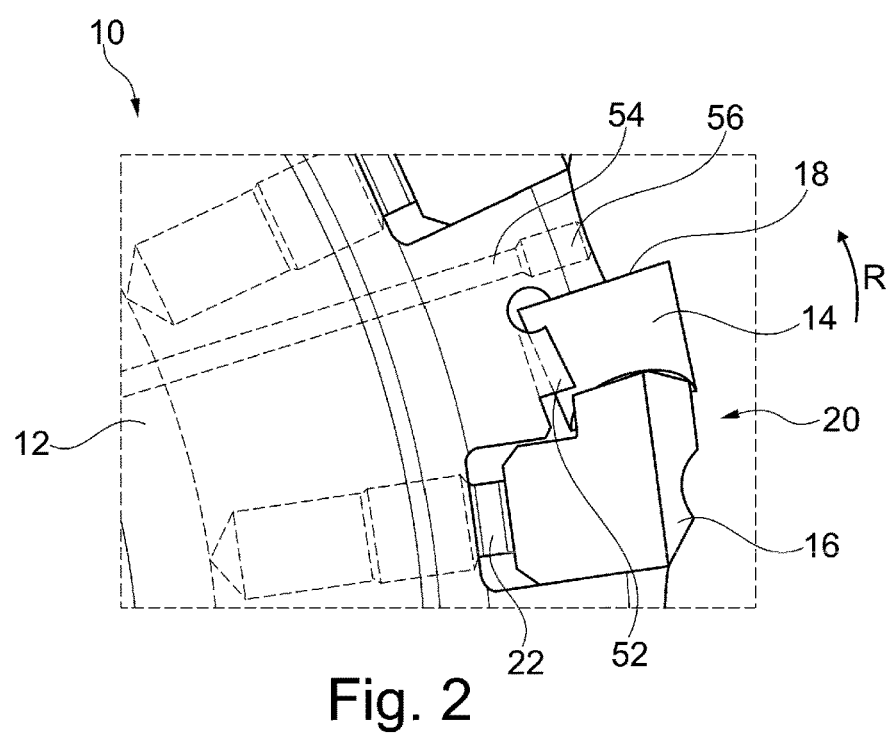
FIG. 2 shows a detailed view of FIG. 1.

FIG. 2 shows a section of FIG. 1, wherein the securing of a cutting insert 14 to the tool body 12 via the clamping element 16 is shown in detail.

Figure 3:
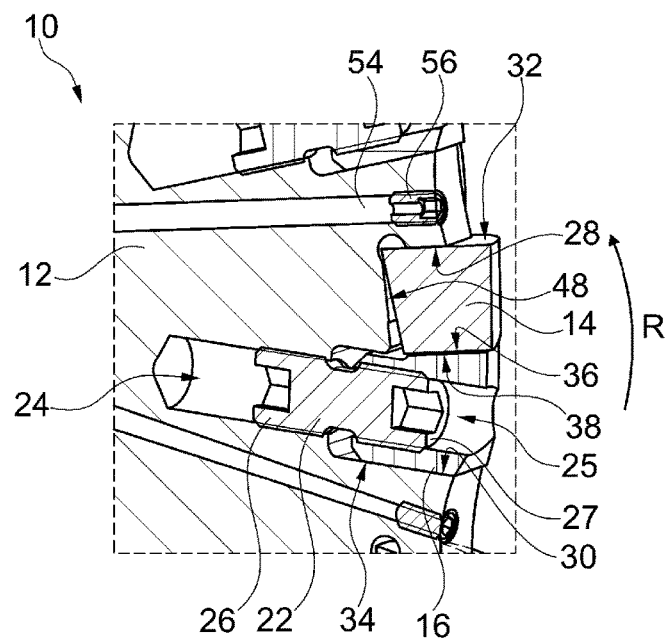
FIG. 3 shows a sectional view of FIG. 2.
Figure 4:
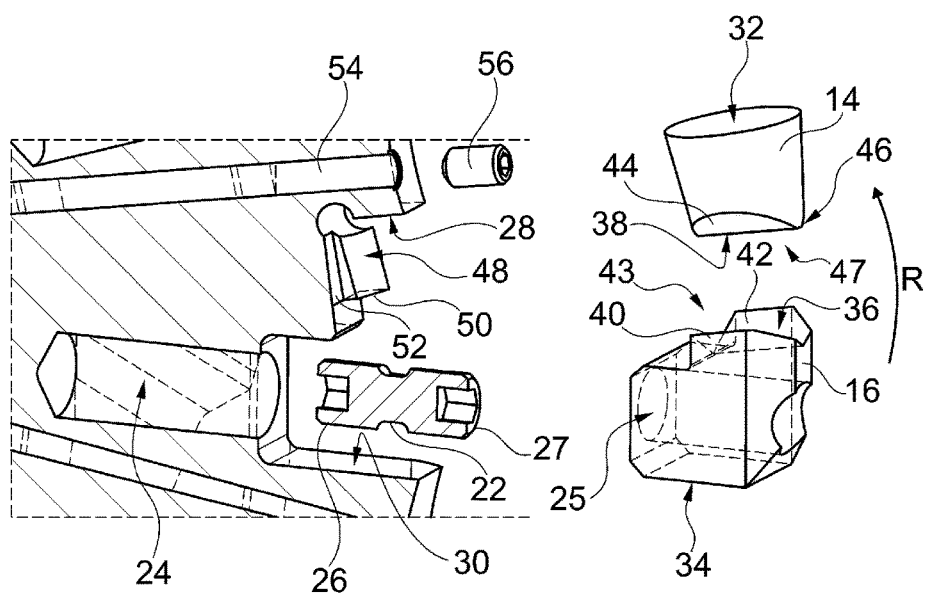
FIG. 4 shows an exploded view of FIG. 3.
Figure 5:
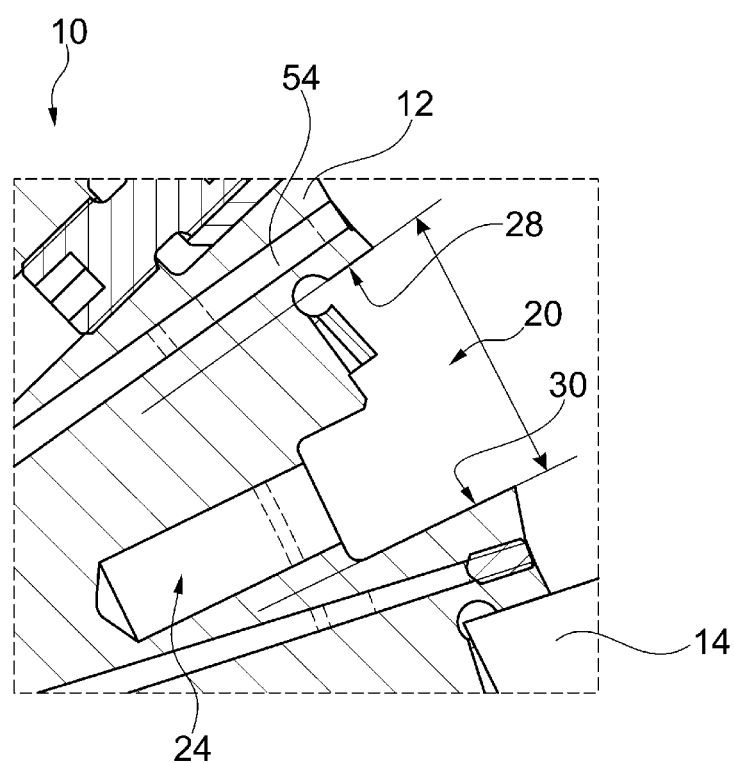
FIG. 5 shows a detailed view of a receiving area.

FIG. 3 shows the section shown in FIG. 2 in a sectional view, whereas FIG. 4 shows an exploded view of FIG. 3. FIG. 5 shows only the tool body 12 without cutting insert 14 and clamping element 16 in a section comparable to that of FIGS. 2 to 4.

The securing and orientation of the cutting insert 14 via the clamping element 16 is described below in reference to FIGS. 2 to 5.

The cutting insert 14 comprises at least one cutting edge 18, via which the cutting insert 14 engages a workpiece not shown here in order to machine the workpiece, i.e. remove material from it. When viewed in the direction of rotation R, the cutting edge 18 is arranged on the front side of the cutting insert 14 (see FIG. 2). If the cutting insert 14 is designed as an indexable insert, two or more cutting edges 18 are provided, which can be used accordingly during a turning of the cutting insert 14 relative to the tool body 12. For this purpose, the cutting insert 14 would have to be loosened and clamped again via the clamping element 16.

The cutting insert 14 as well as the clamping element 16 are respectively received in a receiving area 20 on the tool body 12, wherein the clamping element 16 clamps the cutting insert 14 between said clamping element and the tool body 12. Such a receiving area 20 is shown in detail in FIG. 5 without the cutting insert 14 and the clamping element 16.

The clamping element 16 is secured via a set screw 22 to the tool body 12, which tapers radially inward, i.e. toward the axis of rotation D. In the process, the set screw 22 engages with a hole 24 in the tool body 12 as well as with a threaded hole 25 on the clamping element 16 (see in particular FIGS. 3 and 4). The clamping element 16 is thus secured via the radially inward directed set screw 22 to the tool body 12, i.e. substantially tangential to the direction of rotation R.

The first axial end region 26 of the set screw 22 engages with the hole 24 in the tool body 12, whereas the second axial end region 27 engages with the threaded hole 25 on the clamping element 16. The hole in the clamping element 16 is continuous so that the set screw 22 can be operated from the outside through the clamping element 16.

The set screw 22 is preferably provided with two opposite threads on its axial end regions 26, 27 so that during screwing in of the set screw 22, a fast securing of the clamping element 16 to the tool body 12 takes place since at the same time, the set screw 22 is screwed into the hole 24 and the clamping element 16 is pulled radially inward via the set screw 22.

The hole 24 in the tool body 12 is preferably provided in a notch in the tool body 12, along which notch the clamping element 16 is guided into the receiving area 20. The clamping element 16 is thus guided by the notch to the specified position in the tool body 12 or in the receiving area 20.

The receiving area 20 is formed by the tool body 12, wherein said receiving area extends between a front stop surface 28 of the tool body 12 and a rear stop surface 30 of the tool body 12 (see in particular FIG. 5). Accordingly, the cutting insert 14 and the clamping element 16 are arranged between the front stop surface 28 and the rear stop surface 30 and clamped in the secured condition.

The two stop surfaces 28, 30 have a shape that tapers toward the axis of rotation D of the tool body 12 or the milling cutter 10, this means that the receiving area 20 is designed to be tapered or wedge-shaped toward the axis of rotation D. This is illustrated by the auxiliary lines shown in FIG. 5.

In the secured condition, the cutting insert 14 abuts flatly against the front stop surface 28 via a front contact surface 32, since the cutting insert 14 is pushed from behind against the front stop surface 28 by the clamping element 16 (see in particular FIG. 3). In this case, the clamping element 16 is supported on the rear stop surface 30 of the tool body 12 via a rear clamping surface 34. When viewed in the direction of rotation R, the clamping element 16 is thus arranged behind the cutting insert 14, whose cutting edge 18 thus lies on the side opposite the clamping element 16.

The rear stop surface 30 and the rear clamping surface 34 are designed to be complementary to one another, which means that their geometries are adapted to each other. In the embodiment shown, the rear clamping surface 34 and the rear stop surface 30 have a flat geometry, whereby the rear clamping surface 34 can be supported with its entire surface on the rear stop surface 30. Alternatively, one of the surfaces can comprise elevations and the other one of the surfaces can comprise complementary depressions.

The force required for clamping the cutting insert 14 is transferred by the clamping element 16 via a front clamping surface 36 to a rear contact surface 38 that is provided on the cutting insert 14.

The front clamping surface 36 and the rear contact surface 38 are also designed to be complementary to one another. The front clamping surface 36 is formed by two partial surfaces 40, 42 that are tapered away from one another in the direction of rotation R and that form a receiving contour 43 for the cutting insert 14 (see in particular FIG. 4). On the other hand, the rear contact surface 38 is [formed] by two partial surfaces 44, 46 that are tapered toward one another against the direction of rotation R and form a wedge 47, the tip of which, when viewed in the axial direction and in the direction of rotation R, is arranged centrally on the cutting insert 14 and extends over its entire height. The facing front clamping surface 36 and the rear contact surface 38 are thus designed to be complementary to one another, wherein the receiving contour 43 of the front clamping surface 36 receives the wedge 47 of the rear contact surface 38.

This means that during clamping of the cutting insert 14, the front clamping surface 36 clamps the rear contact surface 38 of the cutting insert 14 in a predefined position with respect to the direction of rotation R as well as within the receiving area 20 in the axial direction.

The tapered partial surfaces 40 to 46 on the cutting insert 14 and on the clamping element 16 ensure that the cutting insert 14 is oriented with its central axis tangentially to the direction of rotation R.

FIG. 3 in particular shows that the front clamping surface 36 takes a position, which is inclined radially inward relative to the direction of rotation R, in the region of the intersection of the two partial surfaces 40, 42, which result in a groove-like front clamping surface 36. The front clamping surface 36, in particular the groove-like center, thus comprises, when viewed in the axial direction, an acute angle relative to the radial direction.

The clamping element 16 thus encloses via its front clamping surface 36 with the front stop surface 28 of the tool body 12 a partial area of the receiving area 20, which partial area is also tapered radially inward in order to support the radially inward directed clamping of the cutting insert 14.

The desired orientation of the cutting insert 14 in the receiving area 20 is furthermore supported by a seat surface 48 being provided on the tool body 12, said seat surface being substantially tangential to the direction of rotation R of the tool body 12 (see in particular FIG. 4).

When viewed in the axial direction, the seat surface 48 encloses an angle of less than 90° with the front stop surface 28, which ensures that a force acting in the direction of rotation R as well as radially inward is exerted on the cutting insert 14 via the clamping element 16 during clamping so that the force being exerted on the cutting insert 14 by the clamping element 16 pushes the cutting insert 14 against the front stop surface 28 and against the seat surface 48.

The seat surface 48 is furthermore formed by two partial surfaces 50, 52, which are tapered toward each other when viewed radially inward and of which only partial surface 52 is indicated in FIGS. 3 and 4. The partial surface 52 can be seen better in FIG. 2. The partial surfaces 50, 52 ensure that the cutting insert 14 with the lateral surface associated with the seat surface 48 is held securely in the vat-like or groove-like seat surface 48 and supported laterally.

The cutting insert 14 itself is, when viewed in the axial direction, tapered toward its center axis so that it can accordingly be clamped by the clamping element 16 in the direction of rotation R and radially inward and is supported by the seat surface 48, which has an angle of less than 90° relative to the front stop surface 28. In particular, the cutting insert 14 can thus be supported with its entire surface via its lateral surface associated with the seat surface 48 on the seat surface 48.

Furthermore, each cutting insert 14 is associated with a cooling channel 54 that is arranged in the direction of rotation R in front of the cutting insert 14. This ensures that the cooling liquid exiting the cooling channel 54 cools the cutting insert 14, in particular its cutting edge 18, during operation of the milling cutter 10.

At the end of the cooling channel 54 is furthermore provided a nozzle 56, which distributes the cooling liquid exiting the cooling channel 54 in a spraying manner onto the cutting insert 14.

The cutting inserts 14 are preferably indexable inserts and/or ceramic inserts, whereby a cost-effective milling cutter 10 is created since the cutting inserts 14 can be used several times and/or can be formed from a cost-effective material.

According to the present invention, a milling cutter 10 is thus created, which allows for an optimal orientation and positioning of the cutting insert 14 since the cutting insert 14 is supported in the region of its cutting edge 18 directly on the tool body 12.

This is achieved by the cutting insert 14 being clamped with the side comprising the cutting edge 18 directly on the tool body 12, i.e. without a clamping element mounted between them. According to the present invention, the clamping element 16 is arranged in the direction of rotation R behind the cutting insert 14 so that the clamping element 16 clamps the cutting insert 14 from behind.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention

The invention claimed is:

1. A milling cutter comprising:
a tool body having a movable clamping element, the cutting insert comprising a front contact surface and a rear contact surface on a side opposite the front contact surface; and
at least one cutting insert removably secured to the tool body by the movable clamping element, the at least one cutting insert comprising a cutting edge pointing in a direction of rotation,
wherein the clamping element clamps the cutting insert from behind and is arranged on a rear side of the cutting insert in the direction of rotation of the milling cutter;
wherein the tool body and the cutting insert abut against each other flatly in the direction of rotation via the front contact surface;
wherein rear stop surface force is applied on the rear contact surface of the cutting insert by the front clamping surface of the clamping element; and
wherein the rear stop surface is nonplanar.

2. The milling cutter of claim 1, wherein the rear contact surface has two partial surfaces which are tapered toward one another against the direction of rotation, and between which a wedge is formed.

3. The milling cutter of claim 2, wherein the clamping element has a receiving contour for the wedge, the receiving contour being formed at least in sections by the front clamping surface.

4. The milling cutter of claim 1, wherein at least one rear stop surface is provided on the tool body on which the clamping element is supported with a rear clamping surface.

5. The milling cutter according to claim 4, wherein:
the milling cutter defines an axis of rotation; and
the front stop surface and the rear stop surface together form a receiving area for the cutting insert and the clamping element, the receiving area tapering toward the axis of rotation.

6. The milling cutter of claim 4, wherein:
the front stop surface and the front contact surface define a first pair of adjoining surfaces;
the front clamping surface and the rear contact surface define a second pair of adjoining surfaces;
the rear stop surface and the rear clamping surface define a third pair of adjoining surfaces; and
at least one of the first pair of adjoining surfaces, the second pair of adjoining surfaces, and the third pair of adjoining surfaces has geometries that are complementary to one another.

7. The milling cutter of claim 1, wherein the front stop surface and the front clamping surface delimit a space for the cutting insert, the space tapering toward the axis of rotation.

8. The milling cutter of claim 1, wherein:
the tool body comprises a seat surface; and the clamping element pushes the cutting insert radially inward against the seat surface.

9. The milling cutter of claim 8, wherein, when viewed in an axial direction, the seat surface and the front stop surface enclose an angle of less than 90°.

10. The milling cutter of claim 8, wherein a notch is provided in the tool body after the seat surface when viewed against the direction of rotation, the notch being designed as a guide for the clamping element.

11. The milling cutter of claim 1, wherein:
the cutting insert defines a center axis; and
the cutting insert tapers toward the center axis when viewed in an axial direction.

12. The milling cutter of claim 1 further comprising a set screw via which the clamping element is adjustably secured to the tool body.

13. The milling cutter of claim 12, wherein the set screw is radially adjustable.

14. The milling cutter of claim 12, wherein the set screw comprises first and second opposite threads at axial ends thereof such that the set screw is screwed into the tool body with the first opposite thread and the set screw is screwed into the clamping element with the second opposite thread.

15. The milling cutter of claim 1, wherein the tool body comprises at least one cooling channel that opens in the direction of rotation in front of the cutting insert.

16. The milling cutter of claim 1, wherein the cutting insert is an indexable insert.

17. The milling cutter of claim 1, wherein the cutting insert is a ceramic insert.

18. The milling cutter of claim 1, wherein:
the milling cutter comprises at least two additional cutting inserts and at least two additional clamping elements;
each of the cutting inserts is substantially the same;
each of the clamping elements is substantially the same; and
the cutting inserts and the clamping elements are distributed and arranged on a perimeter of the milling cutter.

19. A milling cutter comprising:
a tool body having a movable clamping element, the cutting insert comprising a front contact surface and a rear contact surface on a side opposite the front contact surface; and
at least one cutting insert removably secured to the tool body by the movable clamping element, the at least one cutting insert comprising a cutting edge pointing in a direction of rotation,
wherein the clamping element clamps the cutting insert from behind and is arranged on a rear side of the cutting insert in the direction of rotation of the milling cutter;
wherein the tool body and the cutting insert abut against each other flatly in the direction of rotation via the front contact surface;
wherein rear stop surface force is applied on the rear contact surface of the cutting insert by the front clamping surface of the clamping element; and
wherein the rear contact surface has two partial surfaces which are tapered toward one another against the direction of rotation, and between which a wedge is formed.

20. The milling cutter of claim 19, wherein the clamping element has a receiving contour for the wedge, the receiving contour being formed at least in sections by the front clamping surface.

21. A milling cutter comprising:
a tool body having a movable clamping element, the cutting insert comprising a front contact surface and a rear contact surface on a side opposite the front contact surface; and
at least one cutting insert removably secured to the tool body by the movable clamping element, the at least one cutting insert comprising a cutting edge pointing in a direction of rotation,
wherein the clamping element clamps the cutting insert from behind and is arranged on a rear side of the cutting insert in the direction of rotation of the milling cutter;
wherein the tool body and the cutting insert abut against each other flatly in the direction of rotation via the front contact surface;
wherein rear stop surface force is applied on the rear contact surface of the cutting insert by the front clamping surface of the clamping element;
wherein:
the tool body comprises a seat surface; and
the clamping element pushes the cutting insert radially inward against the seat surface; and
wherein a notch is provided in the tool body after the seat surface when viewed against the direction of rotation, the notch being designed as a guide for the clamping element.

* * * * *